United States Patent Office 3,430,136
Patented Feb. 25, 1969

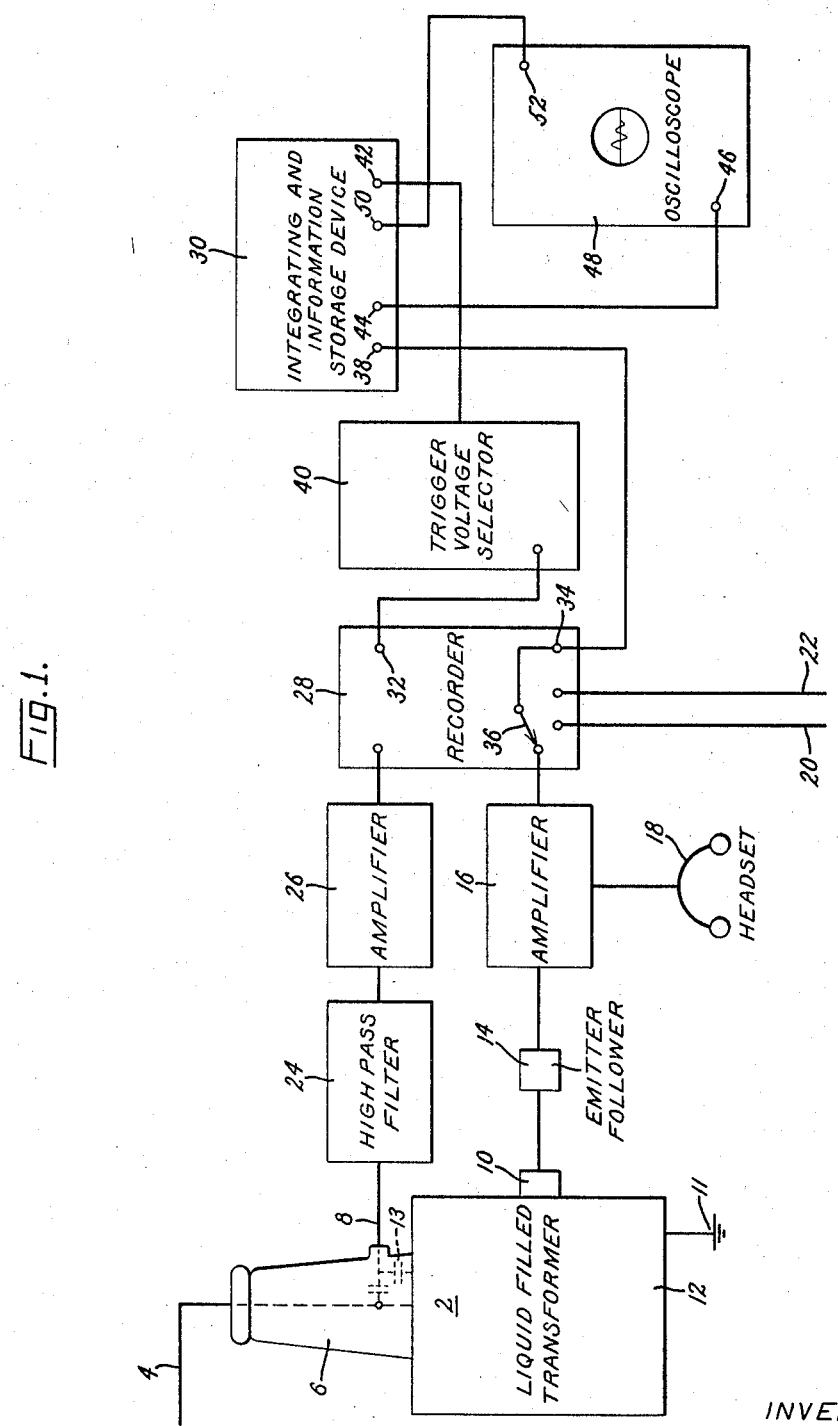

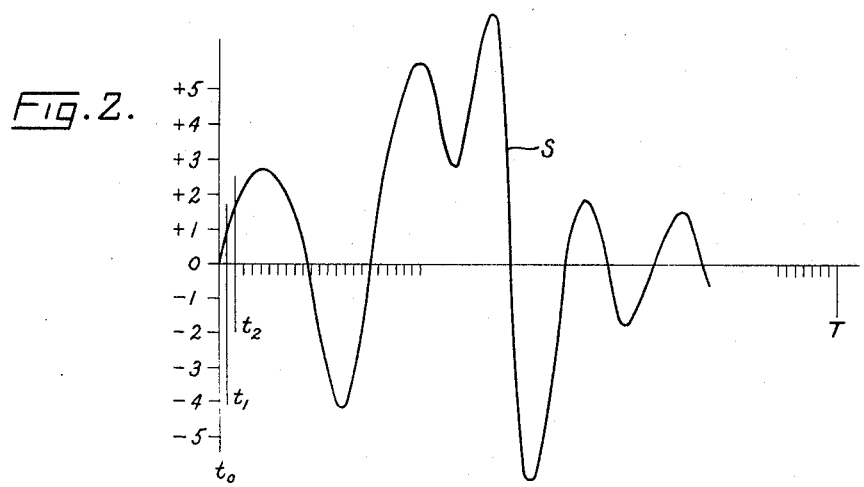
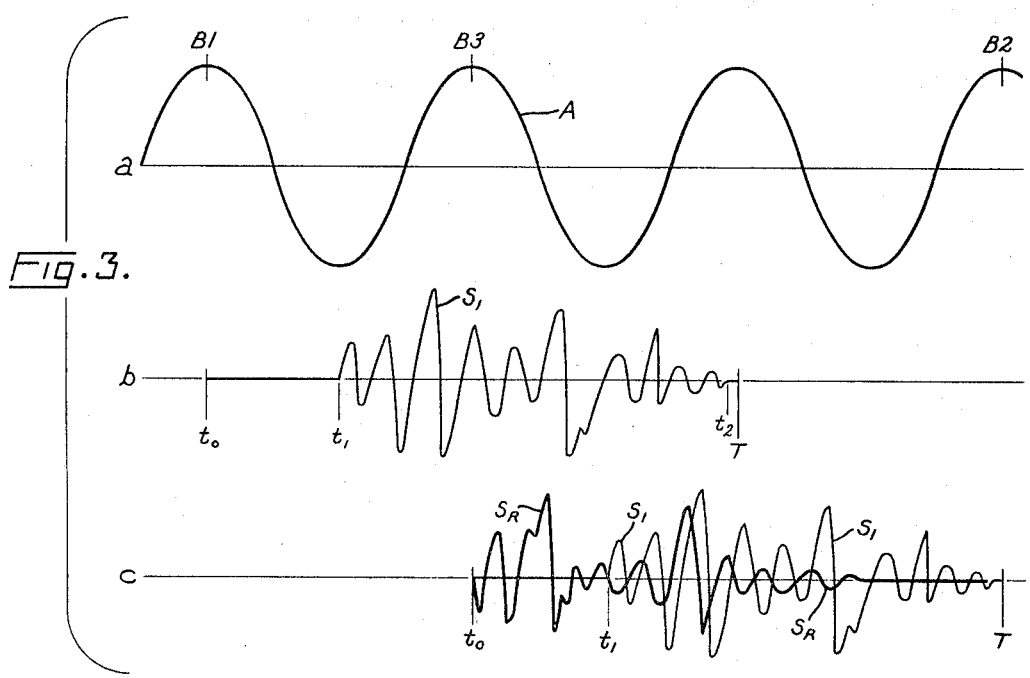
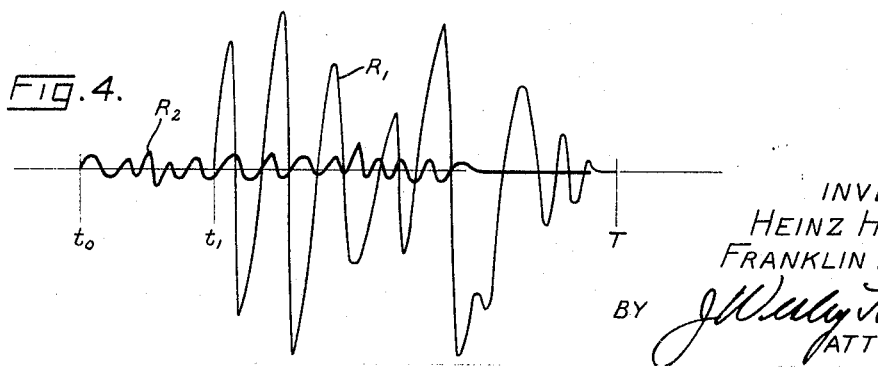

3,430,136
TEST EQUIPMENT FOR IDENTIFICATION AND LOCATION OF ELECTRICAL FAULTS IN FLUID-FILLED ELECTRIC APPARATUS
Heinz H. Brustle, Cheshire, and Franklin A. Fisher, Pittsfield, Mass., assignors to General Electric Company, a corporation of New York
Filed Dec. 21, 1965, Ser. No. 515,373
U.S. Cl. 324—52          8 Claims
Int. Cl. G01r 31/08, 11/00, 31/12

ABSTRACT OF THE DISCLOSURE

An insulation testing and electrical fault locating apparatus, particularly for the location of corona in fluid-filled electric apparatus such as transformers, comprising a sonic signal generating means responsive to fault-initiated vibrations in the fluid, digital integrating means for amplifying a repetitive component and eliminating random components of the signal, and means for determining the delay interval between initiation of such repetitive signal component and initiation of the associated electrical fault.

---

This invention relates to electrical insulation testing equipment, and more particular to improvements in apparatus and systems for detecting and locating incipient faults in encased electrical apparatus of the fluid-filled type.

The present invention is an improvement over the invention disclosed and claimed in Patent 3,173,086 issued to J. S. Kresge on Mar. 9, 1965. The detecting apparatus described and claimed in the foregoing patent comprises a cathode ray oscilloscope in which a horizontal beam sweep circuit is triggered by a signal responsive substantially instantaneously to initiation of an electrical disturbance within encased electrical apparatus, such as corona or spark discharge. Such an internal electrical disturbance as for example a corona burst within a liquid-filled tank, initiates a sonic disturbance in the liquid which is transmitted through the liquid to the tank walls. By means of a sonic transducer located at a selected point on the tank wall, a delayed signal indicative of the electrical disturbance is developed after the interval required for sonic transmission of the disturbance from the source to the transducer. This transducer signal is applied to the vertical deflection circuit of the oscilloscope so that vertical deflection is initiated in time delayed relation with respect to the beginning of beam sweep, the delay interval being determined by the distance between the source of electrical disturbance and the detecting sonic transducer.

A principal use of the foregoing apparatus is in the location of incipient internal insulation faults presaged by the existence of high frequency corona discharge within an apparatus. When the frequency of an applied test voltage is, for example, of the order of 50 to 500 cycles per second, corona may occur in high frequency bursts of short duration one or more times within a single half cycle of applied voltage. Depending upon the internal structure of the apparatus, the quality of the insulation and the intensity and frequency of applied test voltage, recurrent corona bursts may occur in random fashion several times per half cycle or at intervals spaced apart by several cycles of applied voltage.

In the fault-locating system according to the Kresge patent, each individual corona burst initiates a transducer signal having a duration which is the sum of the duration of the corona discharge and the time required for decay of the signal in the transducer output circuit (i.e., transducer ringing time). It will be evident that if the corona bursts occur at only a single fault location and are sufficiently spaced apart so that the transducer signal from one burst is fully terminated before initiation of the next burst, each transducer signal will be discretely displaced upon the oscilloscope. In this case the time delay between the initiation of electrical discharge (which triggers the beam sweep) and the initiation of the transducer signal (and consequent beam deflection) will be clearly discernible. Corona bursts so remotely spaced apart are referred to herein as "intermittent" corona. If, however, the transducer signal from any one corona burst still persists in the transducer output when the next successive triggering burst occurs, the vertical deflection circuit of the oscilloscope will be continuously energized (after the first burst) and the delay interval between the triggering signal and transducer signal originating with any one selected burst is obscured. The condition wherein corona bursts are so closely spaced that overlapping time relation, or interference, occurs in transducer signals is referred to herein as a condition of "steady" corona.

It is accordingly a principal object of our invention to provide an improved insulation fault locating apparatus of the foregoing type wherein the desired time and distance indication in the output signal display is not obscured under conditions of steady corona.

It is another object of this invention to provide an improved electrical fault locating apparatus of the described type in which the initiation of recurrent transducer signals originated at one discrete fault location may be distinguished from random transducer signals due to signal persistence, sonic echoes, and sonic disturbance from other fault locations.

It is still another object of our invention to provide an electrical fault-locating apparatus of the type described in which discrimination between desired and undesired signal components may be obtained after a series of successive test periods of predetermined fixed duration.

It is a more particular object of our invention to provide a fault-locating apparatus of the subject type in which discrimination between desired and undesired signal components may be improved by repeatedly and additionally analyzing signals recorded in a short series of successive test periods.

In carrying out our invention in one preferred embodiment, we provide means similar to that described in the Kresge patent for initiating, or triggering, an electrical test period of predetermined duration upon initiation of a corona discharge at a discrete fault location within a fluid-filled tank containing an electrical apparatus. We provide also a sonic transducer on or within the tank for initiating an oscillatory signal voltage in response to the resulting sonic disturbance and after a delay interval proportional to the direct sonic transmission distance between the fault and the transducer. In our improved apparatus, however, we integrate the transducer output signals developed throughout a plurality of successive test periods initiated by recurrent corona bursts at the same fault location and store a resultant signal wave in an information storage device such as an electrical or magnetic memory register. We find that the desired signal component arising from delayed direct transmission to the transducer is repetitive in successive periods and is thus amplified by integration, whereas random interfering signal components from echoes, other fault locations, transducer ringing and the like will be averaged toward zero. The resulting discrimination between desired and undesired signal components results in a resultant signal wave in which the delay interval between initiation of a test period and initiation of the desired signal component may be readily determined. The stored signal wave may be subsequently displayed at will upon a suitable readout device such as an oscilloscope.

It is another feature of our invention that triggering or initiation of successive test periods is limited to discharge at one discrete fault location by providing triggering means responsive only to discharge impulses of selected magnitude. Preferably adjustable means are provided to select both maximum and minimum values of the triggering impulse to further improve locational discrimination.

Preferably the signal voltage integrating means utilized in conjunction with our invention is such that by repeated digital analysis of a limited series of successive signal waves the accuracy of integration may be improved and the resulting difference between desired and undesired signal components amplified. In this way it is possible by recording and reprocessing signals occurring in a short series of test periods to obtain a discriminated resultant equal in quality to longer term averaging without recording.

Our invention will be more fully understood and its several objects and advantages more fully appreciated by referring now to the following detailed specification taken in conjunction with the accompanying drawing in which:

FIG. 1 is a one-line block diagram of an electrical fault locating system embodying our invention, FIG. 2 is a curve illustrating the method of digital analysis, i.e., analog to digital conversion, utilized in conjunction with our invention, FIG. 3 is a series of curves illustrating representative transducer signal voltages in selected test periods, and FIG. 4 is a curve of resultant signal voltages illustrating separately the integration of repetitive desired components and the integration of random components over several test periods.

Referring now to FIG. 1, we have shown a stationary induction apparatus in the form of a conventional encased, liquid-filled power transformer 2 having a high voltage line lead 4 passing through an insulating bushing 6 with which is associated a low voltage capacitance tap 8. The transformer tank, designated by the numeral 12, is grounded as at the point 11 and the capacitance between the tap 8 and the grounded tank is represented by a capacitor 13. The transformer 2 is normally energized between the line lead 4 and a suitable ground connection (not shown), and may be provided with such usual accessories as an internal tap changing switch. The main internal components of the transformer 2 are a magnetic core and one or more conductive coils (not shown) which are electromagnetically interlinked.

A sonic transducer 10 is shown mounted externally upon a wall of the transformer tank or housing 12. The transducer responds to pressure vibrations in the transformer liquid, such as may originate at the immersed electrical apparatus. The pressure transducer 10 converts mechanical vibrations applied to it into corresponding oscillatory electrical signals. The structure of a suitable transducer, which must be capable of responding to vibrations having a frequency of up to 200 kilocycles per second, is described in the above-cited patent. Preferably such a transducer produces an electrical output signal proportional in frequency, phase and amplitude to the input vibrations.

Electrical output signals from the transducer 10 are fed through an emitter follower circuit 14 to a wide band amplifier 16 of any suitable design. The emitter follower circuit 14 has a characteristic high input impedance and low output impedance which isolates the transducer 10 from the wide band amplifier 16 so that the output voltage of the transducer is not affected by the input impedance of the amplifier. The wide band amplifier preferably has a sensitivity in the order of five microvolts, a gain of 10,000 and a comparatively flat frequency response in the range of approximately 10 to 200 kilocycles per second. Suitable amplifiers of this type are commercially available. The amplifier 16 may have an output tap for a translating device such as a telephone headset 18 which converts electrical oscillations into sound or air vibrations which a trained operator can interpret to detect incipient faults in the transformer 1. One suitable headset is the Clevite, brush BA–220. A high pass filter (not shown) may be in circuit ahead of the amplifier 16 to eliminate power frequency and other low frequency signals.

As set forth in the above-cited Kresge patent, a transducer such as the transducer 10 may be moved to different points on the transformer casing 12 and a test of the transformer can be made with the transducer 10 at each of these points. A fault at any one discrete location will be indicated as being at a different distance from each point, and thus by a simple triangulation computation the fault can be located within the transformer. As an alternative, the present invention contemplates the use of three or more separate detection circuits, each including a transducer and associated amplifier. Each transducer is placed at a different point on or within the transformer tank 12 so a plurality of distance indications to a single fault may be recorded or otherwise obtained simultaneously and the fault located through triangulation after a single energization of the transformer. Such circuits from second and third transducers are indicated generally by connecting leads 20 and 22.

The low voltage tap 8 coupled capacitively to the line lead 4 is connected through a high pass filter 24 to a wide band amplifier 26. The high pass filter 24 is designed to filter out frequencies below 2 to 10 kilocycles per second so that power frequency oscillations do not appear in the amplifier 26. The wide band amplifier 26 is similar to the wide band amplifier 16, preferably having a substantially flat response in the range of 2 to 200 kilocycles per second. Electrical disturbances in the transformer 2, such as corona discharge or sparking, are reflected substantially instantaneously through the capacitive tap 8, filter 24 and amplifier 26. High frequency impulses thus derived instantaneously as a result of internal corona discharge are utilized as triggering impulses to initiate successive test periods of predetermined duration during which signal voltages from the transducer 10 are measured and integrated in a manner to be described hereinafter. While we have shown capacitive coupling to a line lead conductor for deriving triggering impulses, it will be understood by those skilled in the art that such impulses may be derived by suitable electric coupling to any high potential conductor associated with the enclosed apparatus, such as direct coupling to a transformer winding by electromagnetic or electrostatic means.

The wide band amplifier 16, the leads 20 and 22, and the wide band amplifier 26 are shown coupled to a recorder 28 where signals from each of them are continuously recorded. The recorder itself preferably has a frequency response of up to 200 kilocycles per second. For some applications of this invention, it has been advantageous to use a magnetic tape recorder having 7 channels, such as the type PI–200 sold by Precision Instruments Company. Three of these channels are used to record the transducer signals from the wide band amplifier 16 and the other two transducer signal leads 20 and 22. Another channel may be used to record the oral statements of an operator as he observes the test. From one to three of the remaining channels are used to record electrical triggering signals from a bushing tap 8 and from such similar electrical couplings to the transformer 2 as may be considered desirable. Only one triggering impulse channel is indicated on the recorder 28 shown in FIG. 1.

The trigger signal from the amplifier 26 and a selected transducer signal, as from the amplifier 16, are supplied to an integrating and information storage device 30. In the embodiment shown these signals are supplied to the device 30 from output terminals 32 and 34, respectively of the recorder, the output terminal 34 being connected by a selector switch 36 to a desired one of the transducer signal channels. It will be evident to those skilled in the art that if desired the recorder 28 may be omitted and these signals supplied directly to the integrating and information storage device 30. Preferably, however, a trigger voltage selector device 40 is interposed between the amplifier 26 and the device 30. As illustrated the trigger voltage selector 40 is connected between the trigger signal output terminal 32 of the recorder 28 and a trigger signal input terminal 42 of the integrating and storage device 30. The selected transducer signal from recorder output terminal 34 is supplied to a signal input terminal 38.

The trigger voltage selector 40 comprises essentially means for measuring and selecting triggering impulses from the capacitive tap 8. The trigger voltage selector, which may be a commercial oscilloscope such as the Tetronix Type 532, compares these signal impulses with a reference voltage of selectable magnitude and releases a small pulse from a pulse forming network to the input terminal 42 of device 30 whenever a triggering impulse exceeds the magnitude of the reference voltage. Experience with apparatus for detecting and locating incipient internal faults in electrical transformers has indicated that when there are multiple sources of corona discharge electrical signals from each one tend to have a characteristic amplitude. It is possible to single out signals emanating from the source of corona which is producing the pulses of the largest amplitude. In this manner the present invention can distinguish between electrical signals which occur in more than one location within the transformer 2 and interfere with each other. Preferably the trigger voltage selector 40 provides both maximum and minimum reference voltages so arranged that an output pulse is released only when the triggering impulse is of a magnitude exceeding the lower of the two reference voltage levels but less than the larger of the two levels. With this type of a trigger voltage selector, sources of corona bursts producing signals of a lesser magnitide may be detected in the presence of a source of corona bursts which produces signals of a greater magnitude.

The integrating and information storage device 30 comprises an analog-to-digital converter and a digital computer arranged to digitalize and integrate in a suitable memory storage device oscillatory signal voltages from the transducer 10 over a plurality of successive test periods of selectable fixed duration. The successive test periods are initiated by trigger impulses derived from the electrically coupled capacitance tap 8 through the trigger voltage selector 40 substantially simultaneously with the initiation of a corona burst.

During each such test period the device 30 makes a predetermined number of comparisons of instantaneous signal voltage magnitude with selected reference voltages and derives from each such instantaneous signal voltage a digital signal. A predetermined fixed time is required for each such comparison and derivation and means are provided for selecting a predetermined number of comparison cycles, the sum of which constitutes a predetermined signal sweep or test period. Preferably the test period duration is suitable for display along the horizontal sweep axis of an oscilloscope 48 or upon another appropriate readout device.

Oscillatory signals appearing at the output of the transducer 10 during each successive test period are supplied to the integrating device 30 through an input terminal 38. In operation the integrating and storage device 30 converts instantaneous analog values of the transducer signal wave to digital form throughout each test period and integrates the digitalized instantaneous values in a suitable electric or magnetic memory storage element thereby to produce an integrated resultant transducer signal having a duration equal to a single test period. A suitable commercially available digital integrating and information storage device of the type indicated by the reference numeral 30 is a device known as the Enhancetron 1024 Model ND–800 manufactured by Nuclear Data, Inc. of Palatine, Ill.

The oscilloscope 48 is provided with a beam sweep input terminal 46 and a vertical deflection input terminal 52 connected respectively to output terminals 44 and 50 of the digital converter and information storage device 30. When display, or readout, upon the oscilloscope is desired the horizontal beam sweep of the oscilloscope 48 is initiated by a triggering signal applied to the terminal 52 and the integrated resultant signal wave stored in the device 30 is simultaneously supplied to the deflection terminal 46.

The manner in which the device 30 digitally analyzes and converts a typical oscillatory analog transducer signal is illustrated in generalized form at FIG. 2. In the curve of FIG. 2 the abscissa represents time and shows a single test period of duration T made up of a predetermined number of incremental comparison intervals. The ordinant represents a multiple voltage reference scale showing positive and negative relative values from zero to plus and minus 5, respectively, on an arbitrary scale. In operation, the instantaneous value of an oscillatory signal voltage S is compared with the voltage reference scale at each interval in the total time period T. At the first time interval $t_1$, for example, the instantaneous value of the signal voltage S is compared with a single one of the reference voltage values, for example the reference voltage plus 1. If the instantaneous value of the signal voltage is greater than plus 1, a positive impulse is stored in the memory and if smaller, a negative impulse is stored. At the second time interval $t_2$ the instantaneous signal magnitude is compared with another reference voltage value, for example minus 1, and a like digital storage function performed. This is continued throughout the test period utilizing at each incremental comparison interval a different test voltage reference chosen in random but predetermined fixed sequence. Upon initiation a second sweep (i.e., test period), as with a different signal wave present, a like point-by-point comparison is carried out with the same sequence of voltage reference values but with the voltage reference sequence precessed by one position. If a signal wave or a series of signal waves thus digitalized is also recorded in analog form so that repeated sweeps of the same wave or waves may be made by the device 30, each wave may be further analyzed by beginning each repeated sweep of that wave at a different position in the predetermined sequence of reference voltages.

It will be evident that if the voltage signal S is recorded and can be run through the integrating device 30 repeatedly and compared at each instant with each voltage value on the reference scale, accuracy of digital conversion will be improved. If enough reference voltage values are provided, the curve stored in the digital memory of the device 30 will be very close to the actual shape of the curve S.

In the operation of our improved fault-detecting system as illustrated at FIG. 1, a plurality of successive test periods during which input is supplied to the integrating device 30 is initiated by successive triggering impulses. Even though the operation of the trigger voltage selector 40 limits these starting impulses to repetitive corona bursts at a single discrete fault location, the transducer output signal wave in each test period usually differs from those in other periods primarily because of random sonic components from echoes, from other corona bursts during or preceding the period and from signal persistence and transducer ringing extending from one period into the next. This is a "steady" corona condition. In each period, however, the transducer signal component arising from the initiating burst tends to be generally repetitive in shape and is always initiated at a fixed time after initiation of the test period, or sweep. If of course, the initiating corona bursts and the test periods are sufficiently spaced apart in time so that all the random effects arising in each period have decayed to zero before the next period (intermittent corona), only the desired signal component is present at the instant of its initiation in each period. In this case the time delay between test sweep and transducer signal is clearly evident. These effects may be more readily understood by referring to FIG. 3 where we have shown generalized signal curves for each of these conditions.

At FIG. 3a the curve A is a representation of a sinusoidal test voltage applied to the transformer and appearing at the line lead 4. Intermittent corona bursts at times B1 and B2 are indicated on the curve A, and a steady corona condition is indicated on curve A by corona bursts at times B1 and B3. The curve at FIG. 3b represents transducer output voltage during a test period extending from time to $t_0$ to time T, this test period being initiated by the corona burst at B1. As shown at FIG. 3b, the transducer signal wave S1 begins at a time $t_1$ and terminates at time $t_2$. The time $t_0$ to $t_1$ is the time required for sonic transmission between the source of electrical disturbance and the transducer 10. It is evident that a second corona burst occurring at time B2 on the curve of applied voltage would produce a transducer output signal having no interference with the signal S1 and demonstrating the same fixed time delay between $t_0$ and $t_1$.

At FIG 3c we have illustrated a transducer signal wave under steady corona conditions wherein a test period initiated at time B3 on the wave of applied voltage (FIG. 3a) begins while signal voltage is still appearing at the transducer 10 as a result of the prior corona burst at time B1. Thus FIG. 3c shows a signal wave component $S_1$ initiated by the burst at B3 and substantially the same in configuration and delay as the curve $S_1$ of FIG. 3b, but shows also a random signal wave component $S_R$ which exists at the transducer output as a result of random sonic effects independent of the desired signal component $S_1$. It will be understood of course that the actual resultant transducer signal output under the condition steady corona shown at FIG. 3c is the sum of the signal components $S_1$ and $S_R$. It may be observed that the sum of these signal components effectively obscures the time $t_1$ at which the desired signal component $S_1$ is initiated.

In observing the various signal curves at FIG. 3 it sould be kept in mind that a desired signal component such as the signal curve $S_1$ resulting from repeated corona bursts at any one discrete fault location tends to be of generally the same configuration in repeated test periods, at least as to its time of initiation and initial polarity. The random signal $S_R$, however, arising as it does from echoes, random bursts at other locations and signal persistence, is of quite different configuration in each test period. Thus an integration of the desired signal component $S_1$ over a succession of test periods tends to amplify the component $S_1$, while an integration of the random undesired signal component $S_R$ over a plurality of test periods tends to average the undesired components toward zero.

At FIG. 4, we have illustrated a composite test period T in which the integrated resultant of a plurality of desired signal components from a single discrete fault location is indicated at the curve $R_1$ and the integrated resultant of a plurality of random noise signals over a plurality of test periods is indicated at the curve $R_2$. It will be evident that the difference in magnitude between the resultant undesired component $R_2$ and the resultant desired component $R_1$ is such that the sum of these curves (the final integrated resultant signal which is stored in memory for observation) clearly identifies the time of initiation of the desired component $R_1$.

It is evident from the foregoing that in the operation of our improved detection apparatus, repeated triggering of a succession of test periods results in storage in the integrating storage device 30 of a resultant transducer wave having the general appearance of the sum of the curves $R_1$ and $R_2$ at FIG. 4. As pointed out above in connection with FIG. 2, it will be evident that repeated reruns of a succession of recorded test periods for repeated digital analysis of the transducer signal in each period results in greater accuracy of integration and improved accuracy of the resultant signal wave. The recorder 28, therefore, while not essential, is a desirable adjunct to my integrating system and makes it possible to obtain a useful degree of discrimination from a relatively short series of test periods.

As previously mentioned the resultant integrated signal wave of the type generally indicated at FIG. 4 and stored in the digital converter and computing device 30 may be applied for observation over composite test period to the cathode ray oscilloscope 48. The input terminals 46 and 52 of the oscilloscope are connected to orthogonally related deflection axes of the oscilloscope. The terminal 52, for example, may be connected to trigger the beam sweep of the oscilloscope at a time $t_0$ (FIG. 4) indicative of the beginning of a test period, and the input terminal 46 of the oscilloscope may be connected to the vertical deflection circuit of the oscilloscope and to a signal output terminal 44 of the computing device 30.

While we have described a preferred embodiment of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. In an insulation testing and fault locating system for electrical apparatus of the fluid-immersed type having a housing and a high potential conductor insulated therefrom,
  (a) a sonic transducer mounted for response to vibrations in said fluid to develop an oscillatory signal voltage initiated by said vibrations, said vibrations and signal voltage each including a desired component arising from each electric discharge at a discrete fault location within said housing and undesired components from random sonic sources and echoes within said housing, initiation of said desired signal component being delayed with respect to an originating discharge by a fixed time interval determined by the direct sonic transmission distance between said transducer and said fault location,
  (b) voltage comparison means coupled to said transducer for deriving a series of digital signals representative of the polarity and magnitudes of instantaneous signal voltage values throughout a test period of predetermined duration,
  (c) triggering means electrically coupled to said high potential conductor and substantially instantaneously responsive to recurrent electric discharge at said fault location to initiate operation of said voltage comparison means for a series of successive test periods, said desired signal voltage component being initially delayed by said fixed time interval in each said test period and said undesired signal voltage component occurring in random fashion substantially continuously thereby to obscure initiation of said desired signal voltage component in each test period,
  (d) integrating information storage means coupled to said voltage comparison means for averaging and recording the resultant of a plurality of said series of digital signals over a plurality of successive test periods thereby to amplify at least the initial half cycle of a recurrent desired signal component and to average undesired random signal components toward zero in a resultant integrated signal wave of test period duration, and
  (e) readout means coupled to said information storage means for displaying said resultant signal wave over a readout interval of test period duration thereby to identify at least the initiation of said desired signal component within said readout interval and to determine the length of said fixed time interval.

2. An insulation testing and fault locating system according to claim 1 wherein said triggering means includes an impulse generator substantially instantaneously responsive to initiation of a corona burst within said electrical apparatus.

3. An insulation testing and fault-locating system according to claim 1 wherein said readout means comprises a cathode ray oscilloscope having a horizontal sweep circuit actuated upon initiation of a readout interval and a vertical deflection circuit connected to display said resultant signal wave.

4. An insulation testing and fault locating system according to claim 1 wherein said triggering means is responsive to discharge impulse voltages only above a predetermined minimum value.

5. An insulation testing and fault locating system according to claim 1 wherein said triggering means is responsive to discharge impulse voltages only between predetermined adjustable maximum and minimum values.

6. An insulation testing and fault locating system according to claim 1 wherein said transducer develops an oscillatory output signal voltage proportional in frequency, phase and amplitude to the sonic vibrations impinging thereon.

7. In an insulation testing and fault locating system for electrical apparatus of the fluid-immersed type having a housing and a high potential conductor insulated therefrom, (a) a sonic transducer mounted for response to vibrations in said fluid to develop an oscillatory signal voltage initiated by said vibrations, said vibrations and signal voltage each including a desired component arising from each electric discharge at a discrete fault location within said housing and undesired components from random sonic sources and echoes within said housing, initiation of said desired signal component being delaped with respect to an originating discharge by a fixed time interval determined by the direct sonic transmission distance between said transducer and said fault location, (b) voltage comparison means coupled to said transducer for deriving a series of digital signals representative of the polarity and magnitudes relative to at least one reference voltage of instantaneous signal voltage values throughout a test period of predetermined duration.

(c) triggering means electrically coupled to said high potential conductor and substantially instantaneously responsive to recurrent electric discharge at said fault location to initiate operation of said voltage comparison means for a series of successive test periods, said desired signal voltage component being initially delayed by said fixed time interval in each said test period and said undesired signal voltage components occurring in random fashion substantially continuously thereby to obscure initiation of said desired signal voltage component in each test period, (d) recording means coupled to said transducer to continuously record oscillatory signal voltages in analog form throughout said series of test periods, (e) integrating information storage means coupled to said voltage comparison means for average and recording the resultant of a plurality of said series of digital signals over a plurality of successive test periods thereby to amplify at least the initial half cycle of a recurrent desired signal component and to average undesired random signal components toward zero in a resultant integrated signal wave of test period duration, (f) means connecting said signal voltage recording means to said voltage comparison means for repeated instantaneous comparison with additional reference voltages thereby to effect digital conversion and integration of increased accuracy, and (g) readout means coupled to said information storage means for displaying said resultant signal wave.

8. An insulation testing and fault locating system according to to claim 7 wherein said voltage comparison means provides a plurality of reference voltage values and includes digital comparison means operable in any one test period in conjunction with a selected partial group of said voltage values and in a successive test period with a second partial group of different reference voltage values.

References Cited

UNITED STATES PATENTS

| | | | |
|---|---|---|---|
| 2,942,248 | 6/1960 | Huggins | 324—54 |
| 3,173,086 | 3/1965 | Kresge | 324—54 X |
| 3,182,181 | 5/1965 | Schumann | 325—164 |

RUDOLPH V. ROLINEC, *Primary Examiner.*

G. R. STRECKER, *Assistant Examiner.*

U.S. Cl. X.R.

324—68, 54